United States Patent
Blackburn et al.

(10) Patent No.: US 10,973,186 B2
(45) Date of Patent: Apr. 13, 2021

(54) AEROPONICS SYSTEM WITH RACK AND TRAY

(71) Applicant: EZ-Clone Enterprises, Inc., Sacramento, CA (US)

(72) Inventors: William J. Blackburn, El Dorado Hills, CA (US); Brad R. Mickelsen, El Dorado Hills, CA (US)

(73) Assignee: EZ-Clone Enterprises, Inc., Sacramento, CA (US)

(*) Notice: Subject to any disclaimer, the term of this patent is extended or adjusted under 35 U.S.C. 154(b) by 425 days.

(21) Appl. No.: 15/349,308

(22) Filed: Nov. 11, 2016

(65) Prior Publication Data

US 2018/0042191 A1     Feb. 15, 2018

Related U.S. Application Data

(60) Provisional application No. 62/254,100, filed on Nov. 11, 2015.

(51) Int. Cl.
| | | |
|---|---|---|
| *A01G 31/06* | (2006.01) | |
| *A01G 9/02* | (2018.01) | |
| *A01G 9/029* | (2018.01) | |
| *A01G 2/20* | (2018.01) | |
| *A01G 2/10* | (2018.01) | |

(52) U.S. Cl.
CPC .............. *A01G 31/06* (2013.01); *A01G 2/20* (2018.02); *A01G 9/028* (2013.01); *A01G 9/029* (2018.02); *A01G 2/10* (2018.02); *A01G 9/0295* (2018.02); *Y02P 60/21* (2015.11)

(58) Field of Classification Search
USPC ........ 47/62 A, 59 R, 60, 61, 62 R, 63, 62 C, 47/62 E, 79, 82, 83
See application file for complete search history.

(56) References Cited

U.S. PATENT DOCUMENTS

| | | | |
|---|---|---|---|
| 4,332,105 A | | 6/1982 | Nir |
| 4,514,930 A | * | 5/1985 | Schorr .................. A01G 31/02 47/60 |

(Continued)

FOREIGN PATENT DOCUMENTS

WO     WO 2012/153918 A2 * 11/2012 ............... A01G 7/04

OTHER PUBLICATIONS

IDig Hardware, Answers to your door, hardware, and code questions from Allegion's Lori Greene Jan. 28, 2010 [retrieved from internet Jul. 6, 2020 https://idighardware.com/2010/01/survey-q4-what-are-some-of-the-rules-regarding-fire-doors/] 7 pgs.*

*Primary Examiner* — Andrea M Valenti
(74) *Attorney, Agent, or Firm* — Heisler & Associates

(57) ABSTRACT

An aeroponics system is provided which includes a rack with multiple shelves thereon and with a tray accommodated on each shelf. Light modules are located above each shelf. Each tray has a hood with openings therein leading into a hollow chamber and above a base which includes spray heads therein. Water from a reservoir upon the rack is pumped to each of the spray heads to provide a spray within the hollow chambers. Plant cuttings are placed passing through the openings in the hood so that lower portions of the cuttings can receive the spray (and nutrients added into the reservoir) for propagation of the plant cuttings.

2 Claims, 10 Drawing Sheets

(56) References Cited

U.S. PATENT DOCUMENTS

| | | | | |
|---|---|---|---|---|
| 4,976,064 A * | 12/1990 | Julien | | A01G 31/02 |
| | | | | 239/545 |
| 5,544,858 A * | 8/1996 | Rogers | | F16L 37/38 |
| | | | | 251/149.6 |
| 5,673,801 A * | 10/1997 | Markson | | A47F 1/126 |
| | | | | 211/184 |
| 6,105,309 A | 8/2000 | Takayanagi | | |
| 8,910,419 B1 * | 12/2014 | Oberst | | A01G 31/06 |
| | | | | 47/60 |
| 10,492,387 B1 * | 12/2019 | Davison | | A01G 31/00 |
| 2009/0151248 A1 | 6/2009 | Bissonnette | | |
| 2012/0005957 A1 * | 1/2012 | Downs, Sr. | | A01G 31/02 |
| | | | | 47/62 A |
| 2012/0085026 A1 * | 4/2012 | Morris | | A01G 31/06 |
| | | | | 47/62 A |
| 2013/0074408 A1 * | 3/2013 | Singh | | A01G 31/02 |
| | | | | 47/62 E |
| 2013/0247462 A1 * | 9/2013 | Leslie | | A01G 9/247 |
| | | | | 47/82 |
| 2014/0101999 A1 * | 4/2014 | Gardner | | A01G 31/00 |
| | | | | 47/62 C |
| 2014/0144078 A1 | 5/2014 | Gonyer | | |
| 2014/0325908 A1 | 11/2014 | Faris | | |
| 2014/0325909 A1 | 11/2014 | Faris | | |
| 2014/0325910 A1 | 11/2014 | Faris | | |
| 2015/0068122 A1 | 3/2015 | Juncal | | |
| 2016/0345518 A1 * | 12/2016 | Collier | | A01G 9/143 |

* cited by examiner

AEROPONICS SYSTEM WITH RACK AND TRAY

CROSS-REFERENCE TO RELATED APPLICATIONS

This application claims benefit under Title 35, United States Code § 119(e) of U.S. Provisional Application No. 62/254,100 filed on Nov. 11, 2015.

FIELD OF THE INVENTION

The following invention relates to hydroponics and aeroponics systems. More particularly, this invention relates to aeroponics and hydroponics systems which are configured to allow large numbers of plant cuttings to be propagated simultaneously with a minimum of floor space and utilizing a common source of water, nutrients and pressurized water flow, for efficient mass propagation of plant cuttings.

BACKGROUND OF THE INVENTION

Aeroponics is a plant growth technology somewhat akin to hydroponics in that soil is not involved. With aeroponics, roots grow within an air filled chamber. Water and other liquid nutrients are delivered to the plant through roots thereof in the air chamber, typically by spray of water (typically also including nutrients) upon the roots within the chamber. Other portions of the plant grow above a top wall of the chamber where either natural or artificial light is provided.

When cloning or otherwise propagating a plant cutting, aeroponics systems can be highly effective. One problem which is encountered is that it is often desirable to propagate a large number of plant cuttings at initial stages. The cuttings are small so that a large number of cuttings can be confined to a relatively small space. However, the logistics of delivering water and nutrients to a large number of cuttings being cloned in an aeroponics system have, with prior art systems, been daunting. Typical aeroponics systems are small hollow enclosures with a top wall that may have a few dozen locations where plant cuttings can be cloned and initially propagated. Water is separately brought into the interior chamber for delivery of water and/or nutrients. When scaling up such a system, complex bundles of water delivery tubing are required, space for aeroponics enclosures beneath available light is limited, and the overall operation is both difficult to manage and limited in its volume of plant cuttings being propagated per unit of floor space.

Accordingly, a need exists for a system and method to allow aeroponics enclosures to be more efficiently arrayed in a small space and to efficiently and reliably deliver water and/or nutrients, as well as light to such an array of plant cuttings in a high density configuration. Such a system would still beneficially give an operator access to each of the individual cuttings in a convenient manner to tend to the cuttings, and maximize effectiveness of the overall system.

SUMMARY OF THE INVENTION

With this invention a rack is provided which supports multiple individual trays, each tray including an enclosure surrounding a hollow chamber and with a top wall supporting multiple cuttings thereon. The tray includes a hood with the top wall therein, the top wall being preferably substantially planar, rigid and thin with multiple openings passing therethrough. These openings can have a variety of different patterns, but generally are equally spaced from adjacent openings. Preferably, the openings are each surrounded by a recessed shelf. A plant cutting support collar can conveniently fit into this recess and rest upon the shelf so that roots can form and grow below the plant cutting collar, through the opening and within the hollow chamber of the tray, while other portions of the plant cutting can grow above the top wall.

The enclosure of the tray extends down from the hood surrounding the hollow chamber and down to a bottom wall. The bottom wall preferably has a sump at a lower end thereof which can collect water within the hollow chamber and allow it to drain out of the enclosure. The bottom wall includes water feed lines passing therethrough which supply water to at least one misting spray head (and typically an array of eight or more misting spray heads) within a lower portion of the hollow chamber. These misting spray heads are fed by pressurized water (typically also including liquid nutrients) which spray from the misting spray heads and create a fine mist of moisture along with the air inside of the hollow chamber. The water and nutrients thus provide a continuous bath of fresh water and necessary nutrients directly to the roots of the plant cutting.

The rack of this invention supports multiple trays carried by shelves thereof which are preferably configured as drawers. Each rack includes multiple shelves at different elevation levels within the rack. In the embodiment depicted, three such shelves are provided. Above each shelf within the rack a light module is provided so that the plant cuttings can receive light on the foliage thereof. For the shelves other than the top shelf, these lights can be conveniently supported in a shelf area that is above each tray. An additional light source is provided at an uppermost portion of the rack to shine light onto a tray carried by the uppermost shelf. While the shelves are shown as merely sliding drawer hardware at lateral sides of each shelf area, the shelves could include at least portions of a planar horizontal surface at each shelf area.

The rack also conveniently includes a centralized reservoir and a pump. The centralized reservoir receives water (optionally also including nutrients in a liquid form), preferably at a lowermost portion of the rack. This reservoir is typically at atmospheric pressure to allow for convenient adding of additional water, and for adding of nutrients and for sampling of the water, such as to measure attributes of the water and/or nutrients to ensure that the characteristics of the water (e.g. pH and other attributes) can be conveniently monitored. The pump draws from the reservoir and pressurizes the water (optionally with liquid nutrients contained therein) to a pressure required to allow the misting spray heads to optimally perform. The pump delivers this liquid flow to a water supply line. This water supply line leads to each of the shelves. A similar water return line is also provided within the rack which leads back from each shelf to the reservoir.

Each tray includes its own pressurized liquid delivery manifold adjacent a lower portion thereof which preferably begins with one supply port and feeds the multiple misting spray heads (or optionally in some embodiments a single spray head) within the hollow chamber of the tray. A shutoff valve is provided at terminal ends of the water supply lines adjacent to each shelf. These valves are strategically located so that when a tray is placed on a shelf of the rack, the ports come together with the valves and abut each other also sealing and opening the valves. To most effectively and conveniently achieve this alignment, the shelves are preferably configured as drawers with each drawer including a pair of drawer tracks and a pair of drawer arms. The drawer arms slide linearly upon the drawer tracks. The drawer arms support lateral edges of a tray thereon. The tray, when mounted on the drawer arm, can thus have two positions including an open "drawer out" position and a closed "drawer in" position. When the drawer is in the closed position, the drawer arms and drawer tracks are precisely located along with the water supply lines and the drain port on each drain tray so that the drain ports adjacent to the drain and the tray port on the water supply lines are precisely aligned automatically when the drawer is moved to the closed position.

In one embodiment, the drain port and tray ports includes a similar configuration with drain ports and tray ports on each tray and supply ports and return ports on the rack which come into alignment together when the drawer having a tray thereon is transitioned from the open position to the closed position. In the closed position, the tray is positioned under the light within the rack and is optimally configured for plant propagation. When in the open position, the tray is optimally positioned for tending of the plant cuttings by an operator and other procedures such as installing of new plant cuttings, removal of plant cuttings, and other procedures to be performed by an operator most conveniently when the tray can be conveniently accessed.

The tray ports and the supply ports on the water supply lines of the trays are preferably configured to seal effectively together and to also control a shut off valve adjacent each tray port, so that water does not leak out during the various different orientations of the tray including the open position and the closed position. In one embodiment the valves can be quick disconnect fittings which open the valve when mating ports come together and shut the valve when mating ports are separated.

To further encourage such a tight seal, a latch is preferably provided which can be manually (or automatically) engaged when the drawer slides into the closed position. When the mating ports of the shutoff valve come together, the latch can also be closed and the mating ports of the valve cause the valve to open. The actuation of the valve occurs so that when the latch is tightly holding the tray in the closed position, the valve is caused to be opened. When the latch is opened the tray can move away from the closed position and not keep the two mating ports of the valve together, causing the valve to close.

Such coordination of the latches and the shutoff valves for each shelf and tray can be automated, such as by utilizing servo motor type electrically actuatable valves and placing appropriate sensors on the trays and shelves and/or rack. As an alternative, such automatic valve opening and closing can be caused to function through a mechanical linkage so that the same manual actuation associated with closing the tray into the closed position also actuates an electric circuit switch which closes a circuit to deliver electric power to a valve to cause the valve to close (or open).

As another option, the latch itself both opens the valve and tightens the mating portions of the valve together, and similarly closes the valve when the latch is moved to cause the mating portions of the valve to release each other. These latches can be manually operated by a user after the drawer is moved into the closed position. As another alternative, the force associated with sliding the drawer from the open position to the closed position can automatically cause the valves to be opened, such as by having the latches positioned so that the trays themselves or portions of the drawer arms impact the latches as the tray or drawer arm is arriving at the closed position.

In one embodiment, the drain/water out manifold can have an identical or similar set of ports which include valves associated therewith. However, in simpler systems the drain ports could merely be configured so that water draining from the sump and drain of each tray merely pour into port inlets into the drain/"water out" manifold, which would typically only be under atmospheric pressure.

Each rack is preferably located upon wheels to allow for portable movement of the rack upon an underlying substantially horizontal surface. Power can be delivered to the rack from a single power cord which supplies power to the pump and to the lights of the rack, and also to power valves if they are electrically powered, and any other electric systems within the rack. The size of the rack can be selected based on a variety of criteria. The rack depicted herein is configured with shelves sized similarly to each tray so that one tray fits on each shelf. As an alternative, racks could be provided which support multiple trays on each shelf, typically with separate drawers for each tray. The racks can be modular to allow extra shelves to be added, such as to turn a three shelf rack to a four shelf rack. Plumbing can be incorporated into rack sections to facilitate such modularity.

OBJECTS OF THE INVENTION

Accordingly, a primary object of the present invention is to provide a tray which can facilitate aeroponics plant propagation for a large number of cuttings simultaneously.

Another object of the present invention is to provide a tray which reliably contains water therein and avoids leaking.

Another object of the present invention is to provide an aeroponics tray which has a water supply that is pressurized and automatically shuts off when the tray is moved away from a tray support area.

Another object of the present invention is to provide an aeroponics tray which can rest upon one of multiple vertically spaced shelves of a rack with a light above each tray so that vertical stacking of aeroponics trays is facilitated.

Another object of the present invention is to provide a single reservoir and a single pump which can feed multiple aeroponics trays on a common rack.

Another object of the present invention is to provide a convenient method for propagating plant cuttings en masse.

Another object of the present invention is to provide a system for aeroponics plant propagation which is easy to use, provides plant cuttings with the nutrients and water they require in a convenient fashion, and which avoids leaking.

Another object of the present invention is to provide a rack for support of multiple hydroponics trays and lights, as well as a reservoir for water and nutrients and a pump for efficient use of floor space in aeroponics plant propagation.

Another object of the present invention is to provide an aeroponics tray which feeds spray nozzles from channels embedded within a bottom wall of a hollow enclosure of the tray so that a minimum of plumbing is necessitated.

Another object of the present invention is to provide a redundant latching system to keep shelves from inadvertently moving and inadvertently shutting off water flow to any trays upon the rack.

Other further objects of the present invention will become apparent from a careful reading of the included drawing figures, the claims and detailed description of the invention.

DESCRIPTION OF THE PREFERRED EMBODIMENT

Figure 1:
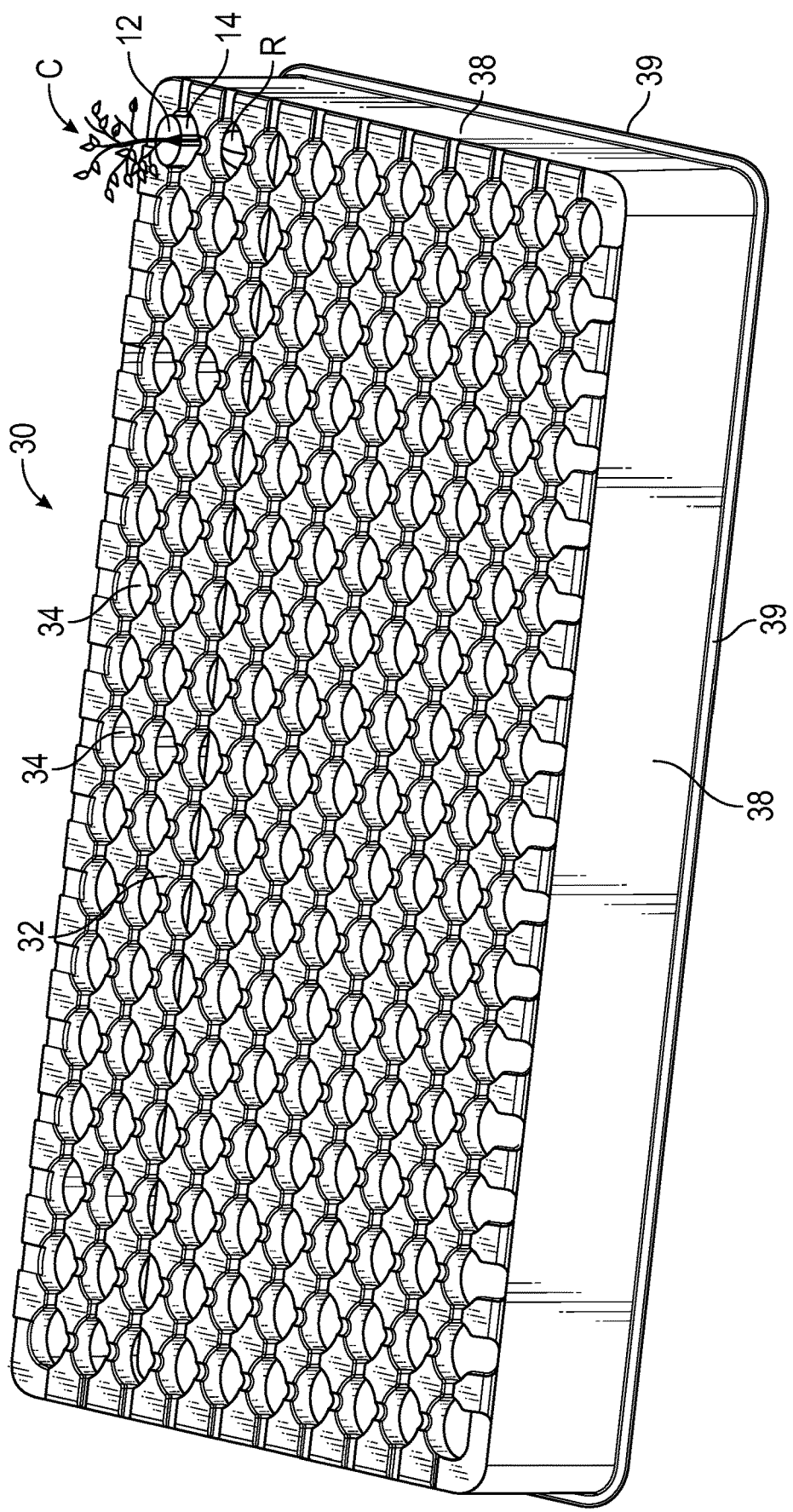
FIG. 1 is a perspective view from above of a hood portion of a tray of this invention according to a preferred embodiment and with a plant cutting held within a collar adjacent one of the openings in the top wall of the tray.
Figure 2:
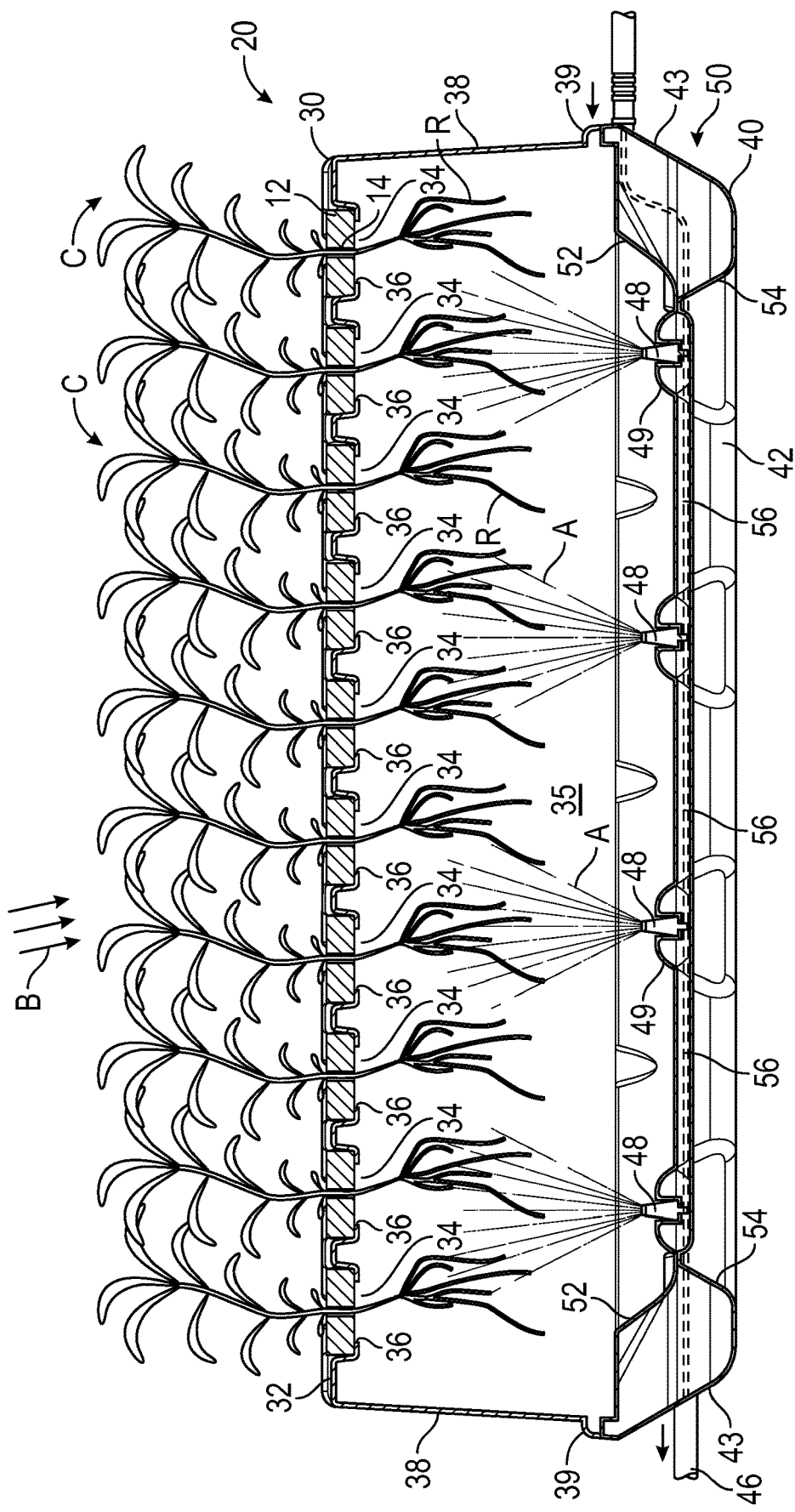
FIG. 2 is a full sectional view of that which is shown in FIG. 1 along with a base portion of the tray and revealing interior details of a hollow chamber, top wall and bottom wall associated with the hood and base of the tray according to a preferred embodiment of this invention.
Figure 3:
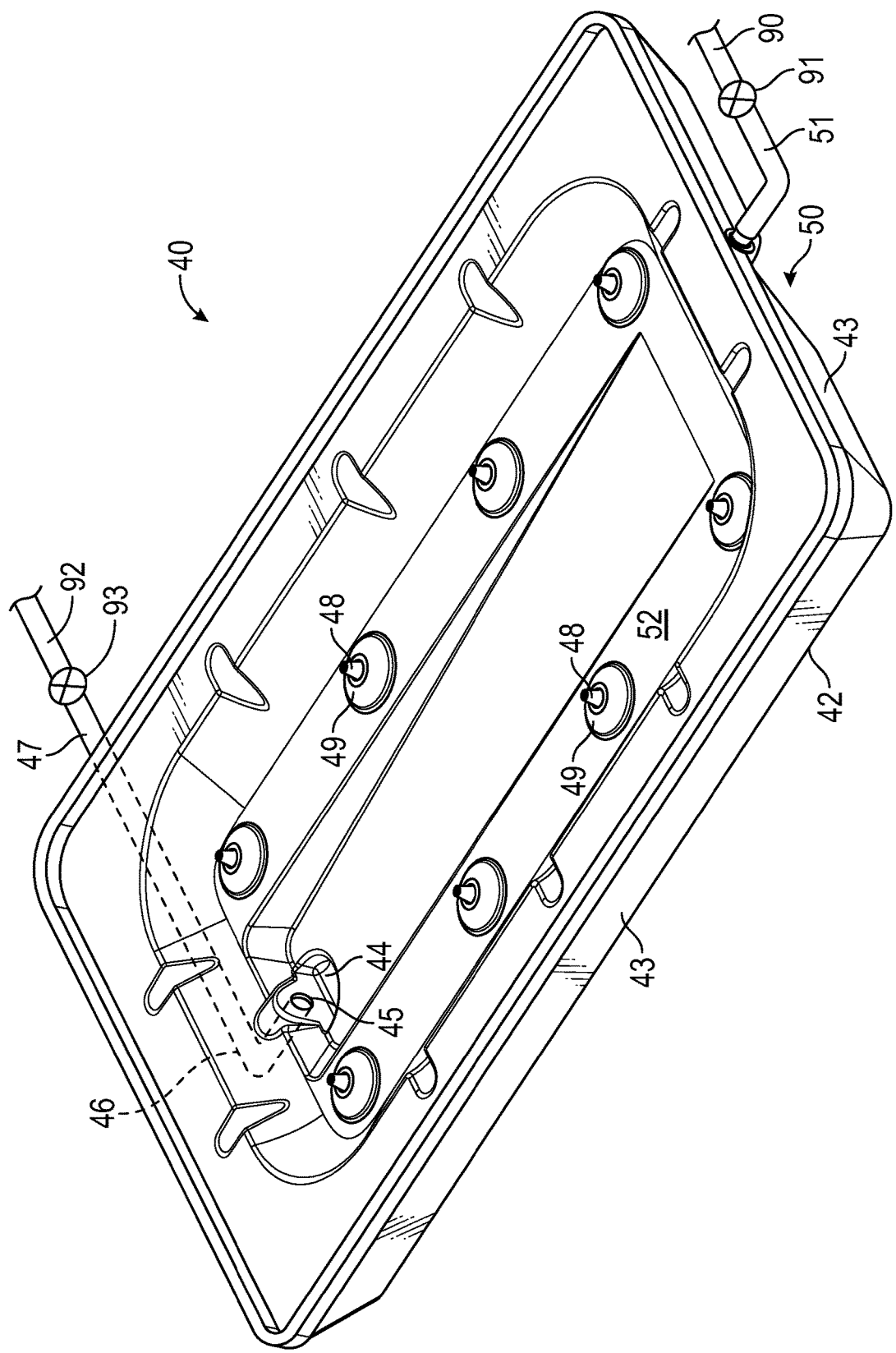
FIG. 3 is a perspective view from above of the base portion of the tray of FIG. 2.
Figure 4:
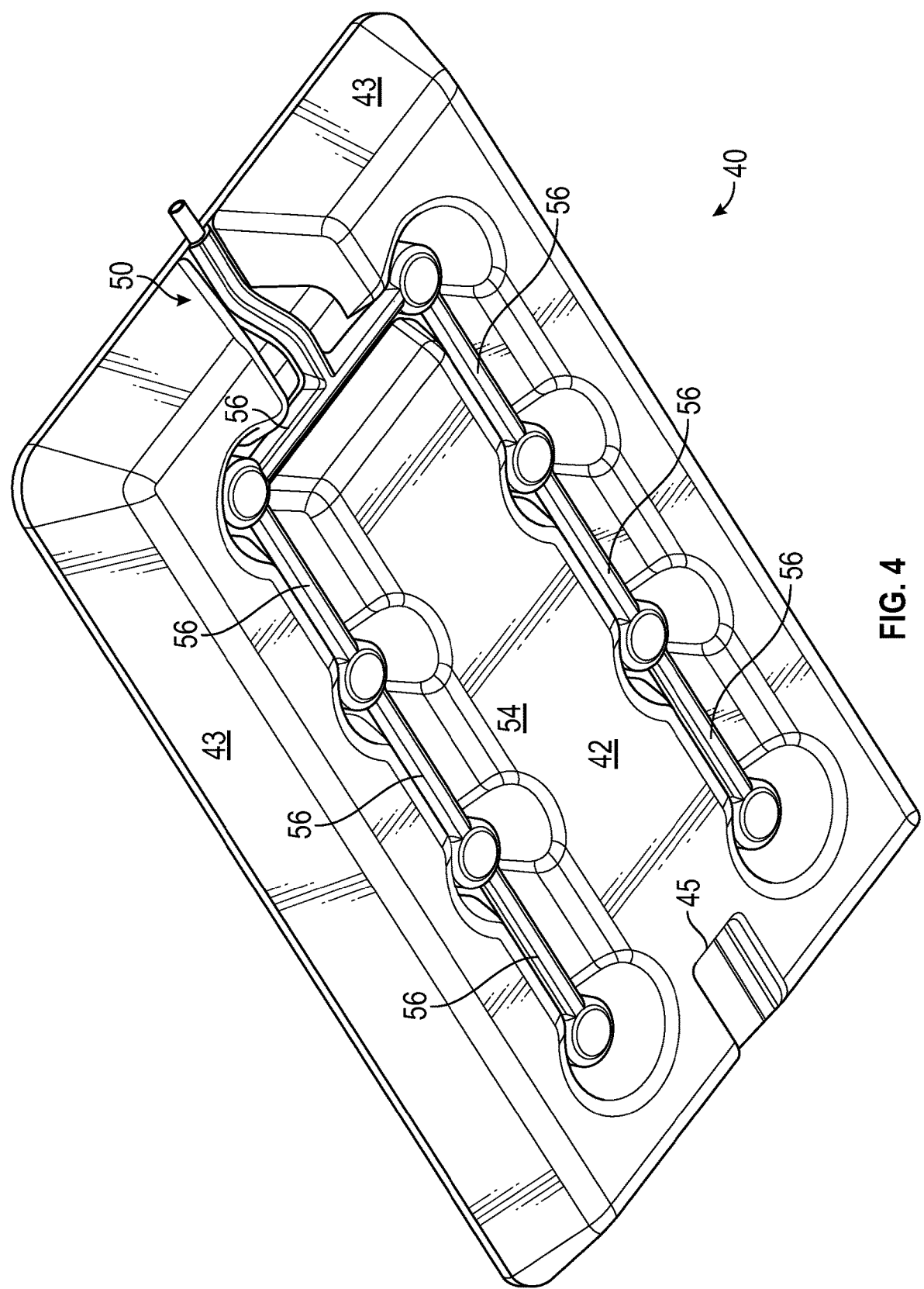
FIG. 4 is a perspective view from below of the base portion of the tray of FIG. 2.
Figure 5:
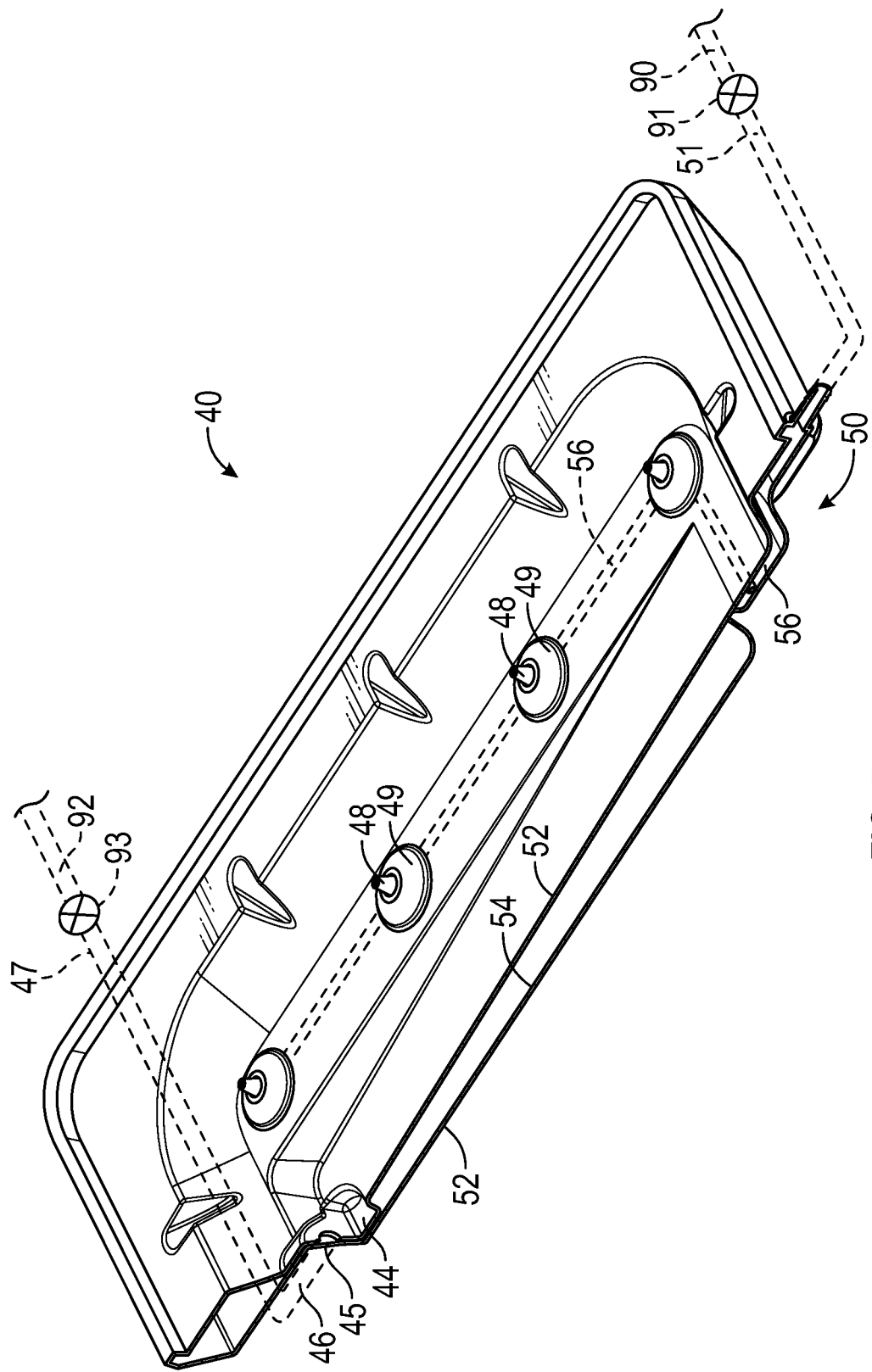
FIG. 5 is a perspective full sectional view of that which is shown in FIG. 3.
Figure 6:
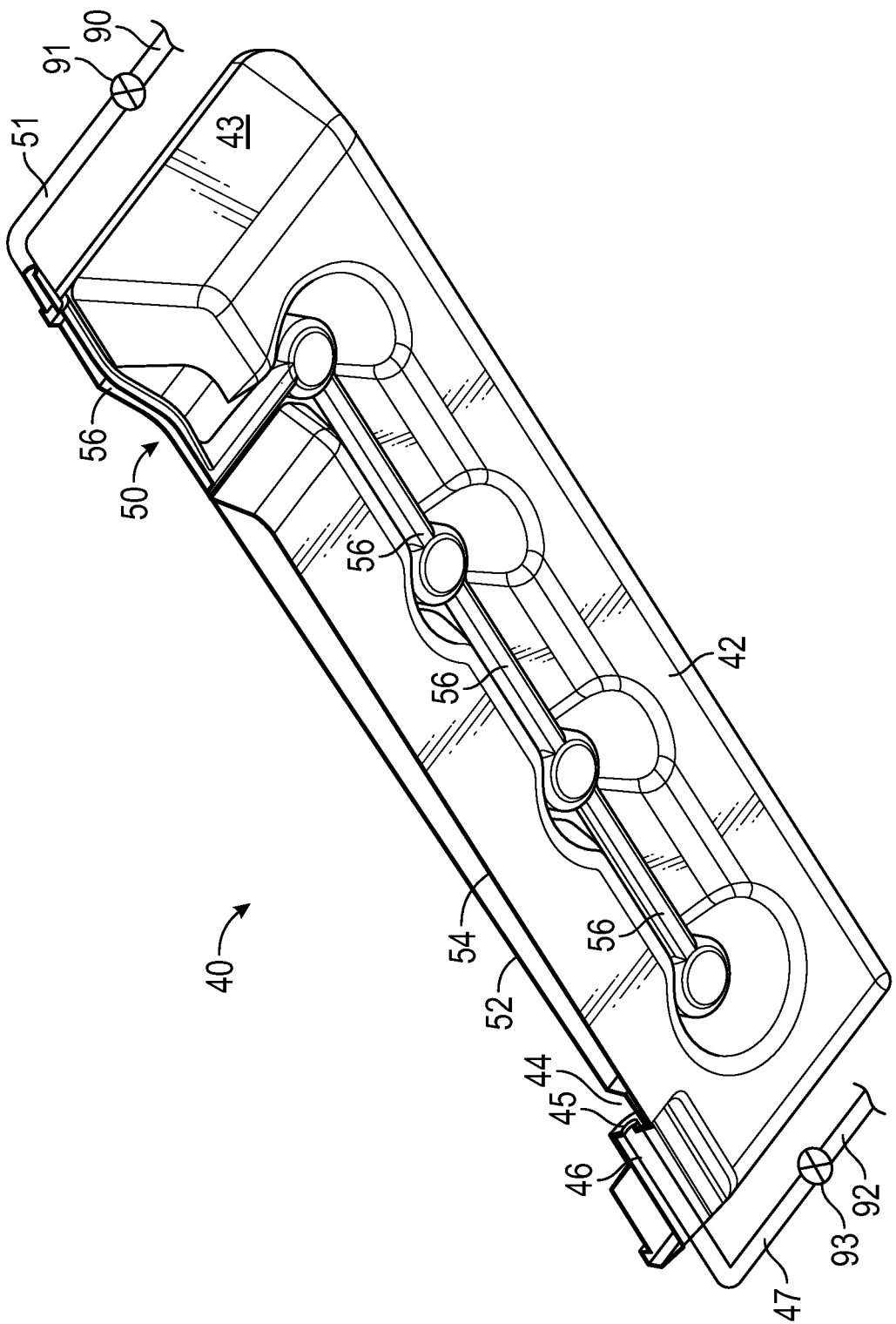
FIG. 6 is a perspective full sectional view of that which is shown in FIG. 4.

Referring to the drawings, wherein like reference numerals represent like parts throughout the various drawing figures, reference numeral 10 is directed to a system for aeroponics plant cutting propagation (FIGS. 3-5). The system includes a tray 20 which is preferably provided as one of many trays 20 all carried by separate shelves 70 of a rack 60. The rack 60 has a reservoir 80, pump 82 and various return and supply pathways to support water and nutrient delivery and return to and from the trays 20 carried by the shelves 70. The shelves 70 slide in and out with automatic shutoff valves 91 associated with supply ports 90 to shut off water flow when the shelves 70 and/or trays are moved from a closed to an opened position.

Figure 7:
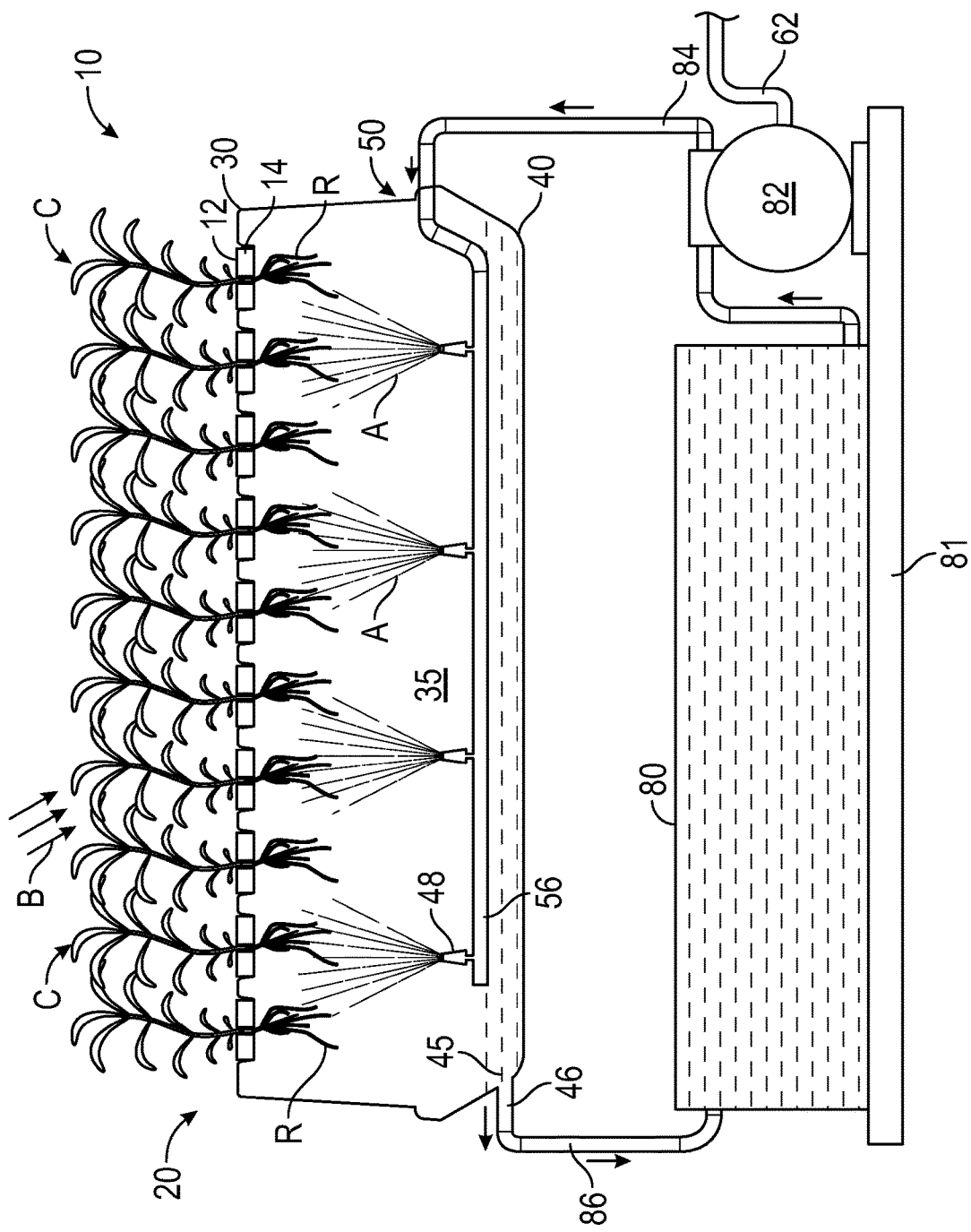
FIG. 7 is a front elevation full sectional view of the system of this invention including one tray along with a reservoir and pump to feed the tray.
Figure 8:
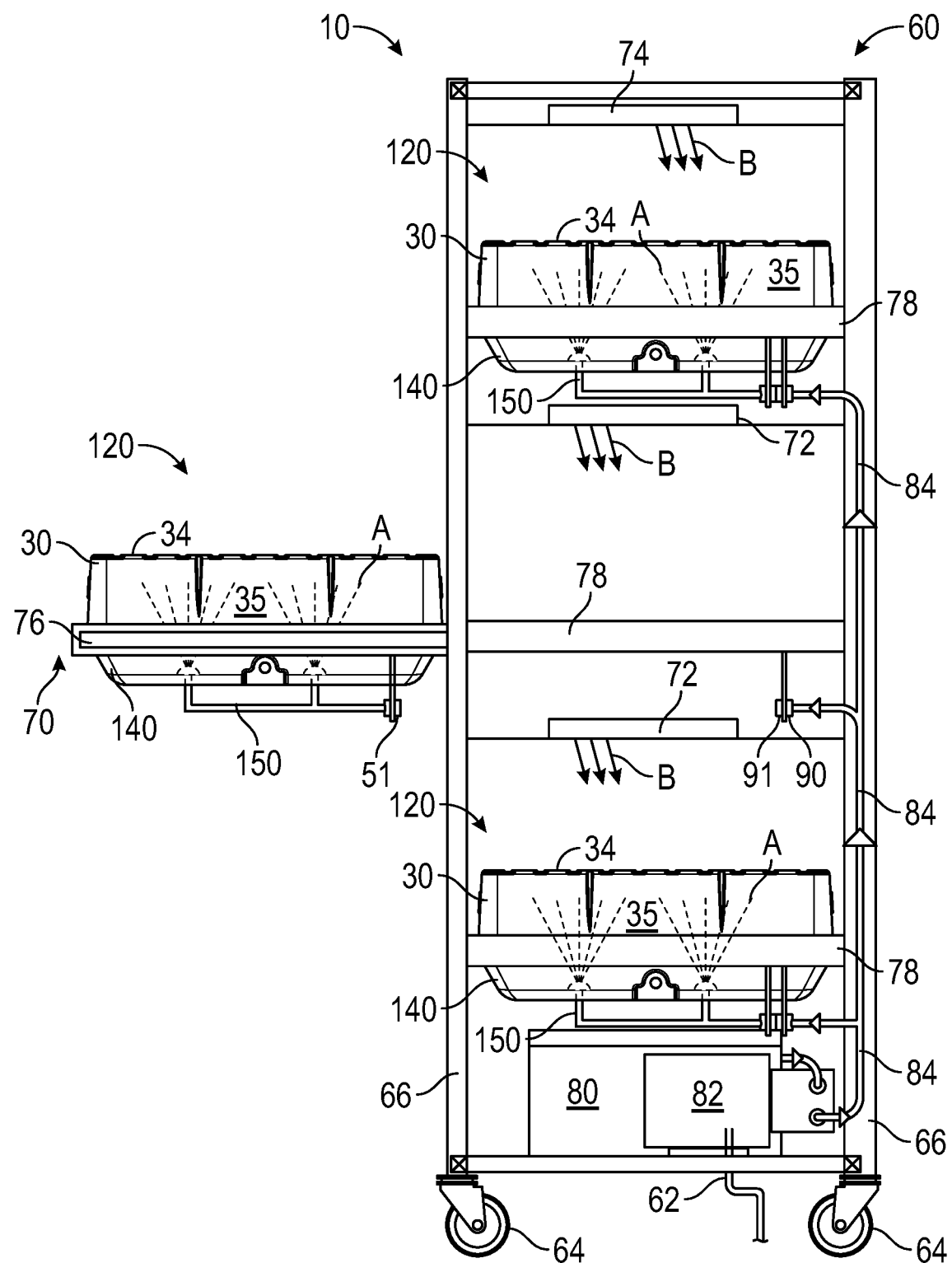
FIG. 8 is a side elevation view of the rack of this invention with one shelf and tray in an open position while two other trays are in closed positions.
Figure 9:
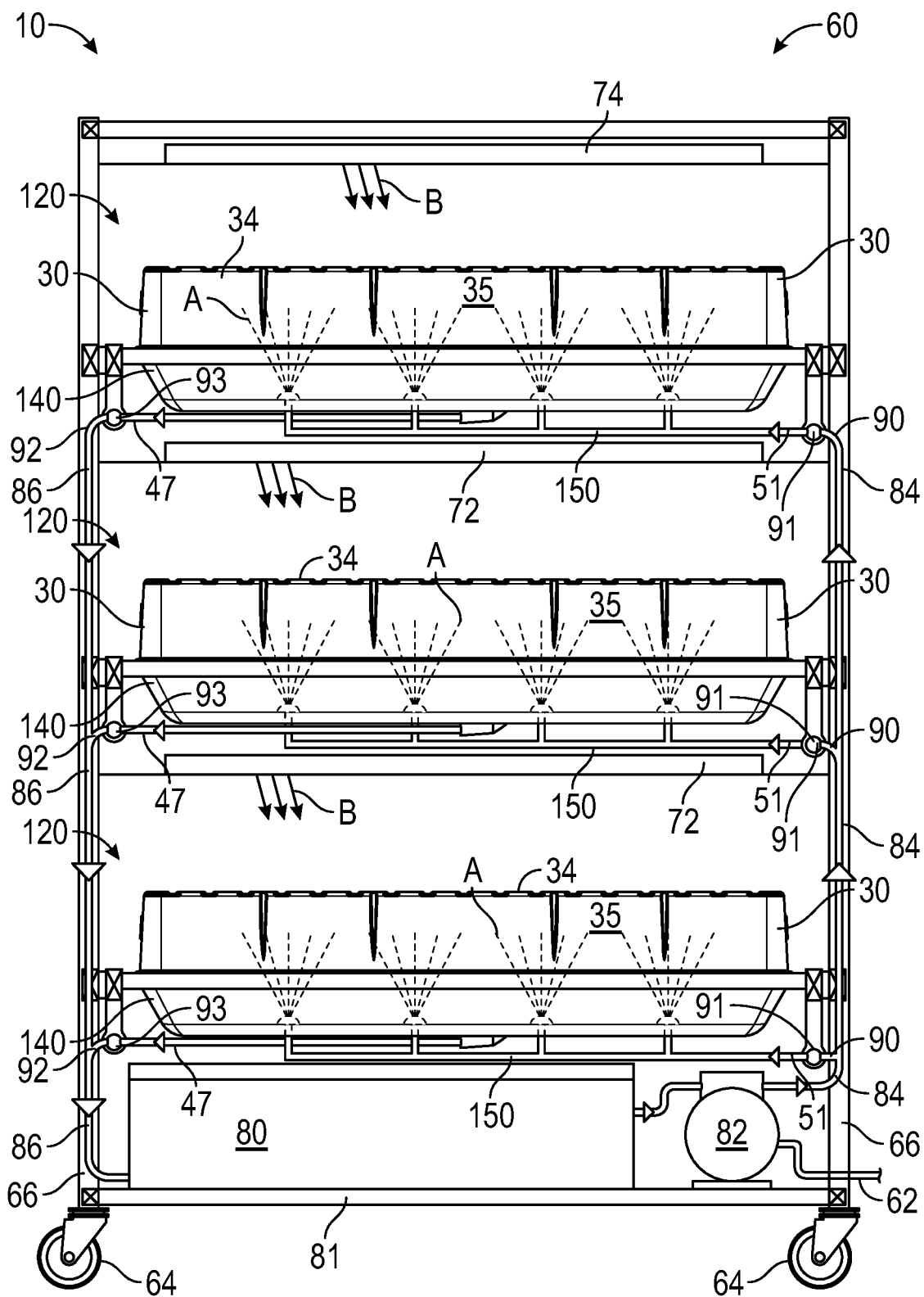
FIG. 9 is a front elevation view of that which is shown in FIG. 8.

In essence, and with particular reference to FIGS. 7-9, basic details of the system 10 of this invention are described, according to a preferred embodiment. The rack 60 of the system 10 includes at least one shelf and preferably a plurality of shelves 70 vertically spaced from each other. A light module 72 is located above each shelf 70. The shelves 70 are configured so that they can slide into and out of the rack 60 beneath the light module 72 and away from the light module 72. The rack 60 includes a common reservoir 80 providing a source of water and preferably also a pump 82 for feeding of pressurized water to spray heads 48 within trays 20.

At least one tray 20 is carried by at least one of the shelves 70, and for maximum efficacy, each of the shelves 70 includes a tray 20 thereon. Each tray 20 has a hood 30 above a base 40 with a hollow chamber 35 between the hood 30 and the base 40. A plurality of openings 34 are formed in a top wall 32 of the hood 30 through which plant cuttings C can be located. The cutting C is held by a collar 12 adjacent one of the openings 34 in the hood 30 of the tray 20. The base 40 includes a water delivery manifold 50 which feeds pressurized water from the reservoir 80 (preferably through the pump 82) to the water delivery manifold 50 associated with each tray 20 on the rack 60. This pathway for pressurized water includes passing through supply ports 90 which include shutoff valves 91 thereon so that pressurized water flow is stopped when the shelves 70 are opened. Return ports 92 preferably align with a drain port 47 associated with the drain 45 within the base 40 of each tray 20 for return of water (and unused nutrients) back to the reservoir 80.

More particularly, and with particular reference to FIGS. 1-6, specific details of the tray 20 of the system 10 are described, according to a most preferred embodiment. The tray 20 preferably includes a hood 30 opposite a base 40 which has the hollow chamber 35 therebetween. The hood 30 is configured to support a top wall 32 with a plurality of openings 34 passing through the top wall 32. Preferably recessed shelves 36 are located adjacent to each opening 34. Collars 12 with or without a plant cutting C therein reside within these recessed shelves and block the openings 34. Most preferably, each collar 12 has a plant cutting C located therein (by passage through a slit 14 in the collar 12) so that the collars 12 both block the openings 34 to avoid water escape and also increase the plant cutting C propagation output of the system 10.

The recessed shelves 36 are preferably configured so that the collars 12 rest upon the recessed shelves 36. As an alternative, the collars 12 could have a perimeter which friction fits within the openings 34, with the collars 12 held by friction, to work with or without the shelves 36. Because the collars 12 are typically formed of a resilient material, such a friction fit is a potential option. If desired, unused openings 34 could be covered with something other than a collar 12 merely to prevent water from escaping.

The hood 30 extends down through side walls 38 from the top wall 32 to a perimeter lip 39. This perimeter lip is supported by the base 40. Such support can be merely with the hood 30 resting on the base 40 or can include some snapping or fastening of the hood 30 to the base 40 which requires some overt action to remove the hood 30 from an adjacent base 40. It is also conceivable that the hood 30 and base 40 could be formed together and not be configured to be openable.

Figure 10:
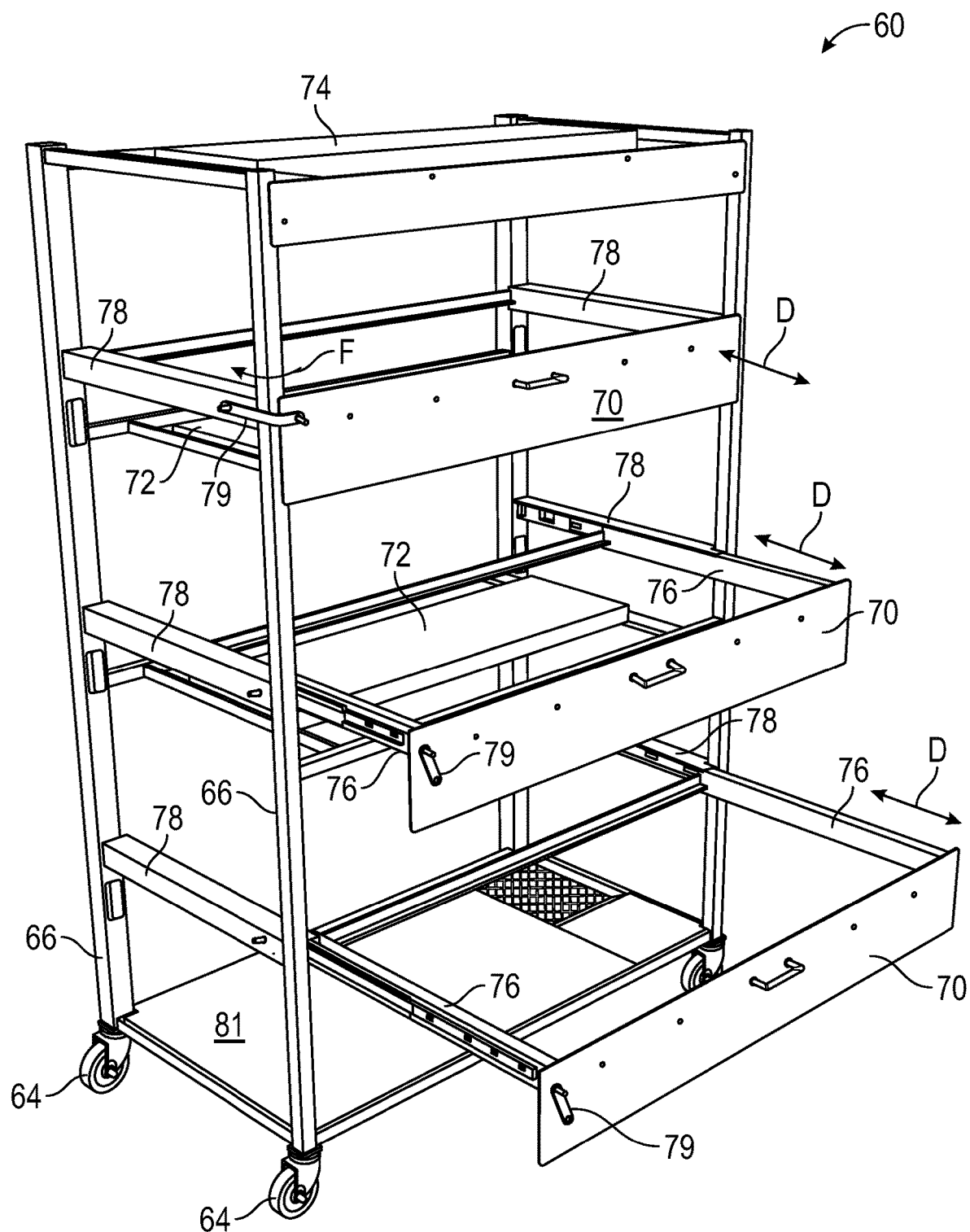
FIG. 10 is a perspective view of the rack without the trays and with one shelf fully open, one shelf partially open, and one shelf fully closed.

The base 40 of the tray 20 lies beneath the hood 30 and is primarily formed by a bottom wall 42. A sump 44 is located, preferably centrally, within the bottom wall 42 which is slightly lower than other portions of the bottom wall 42. A drain 45 exits from the sump 44 and leads to a drain port 47 which can interface with a return port 92 associated with the rack 60 and leading back to the reservoir 80. A shutoff valve 91 is preferably located upon this drain port 47 which keeps water (and any unused nutrients) within the hollow chamber 35 whenever the tray 20 is moved out of its closed position beneath the light module 72, such as by sliding of the shelf 70 upon which the tray 20 is carried, from a closed to an open position. A shutoff valve 93 prevents drain water (and any unused nutrients) from leaking out of the system when one of the shelves 70 is transitioned to an open position (along arrow D of FIG. 10).

The bottom wall 42 preferably also includes at least one spray head 48 passing therethrough, and most preferably a plurality of spray heads. In the embodiment disclosed, eight such spray heads 48 (also called spray nozzles) are provided. Each spray head 48 is preferably located upon a small dome 49. The bottom wall 42 is preferably formed with a threaded opening for each of the spray heads 48 to be connected, and corresponding misting type spray nozzles are threaded into these holes in the bottom wall 42 so that high pressure water is caused to be emitted into the hollow chamber 35 above the base 40 as a fine mist. While the spray heads 48 or nozzles are preferably located within the bottom wall 42, they could conceivably be formed in side walls 43 which lead up to a top rim which engages with the perimeter lip 39 of the hood 30 for closing off of the hollow chamber 35 within the chamber 20.

While external plumbing 150 (FIGS. 8 and 9) could be provided to each of the holes in the bottom wall 42 which is to receive high pressure water at the spray heads 48, most preferably the bottom wall 42 contains a water delivery manifold 50 therein. This water delivery manifold 50 includes multiple channels 56 leading to each of the spray heads 48 and located between an upper surface 52 and a lower surface 54. The upper surface 52 and lower surface 54 are preferably substantially parallel with each other and form portions of the bottom wall 42. Where the upper surface 52 and lower surface 54 are spaced from each other, the channels 56 are provided. In one embodiment the upper surface 52 and lower surface 54 are initially manufactured separately and then are welded together, such as through application of heat, an adhesive, pressure, ultrasonic energy, radiant heat, or some combination thereof to cause the upper surface 52 and lower surface 54 to become sufficiently bonded together where they are spaced from the channels 56 that they avoid leaking when pressurized water is delivered into the channels 56 of the water delivery manifold 50.

A tray port 51 extends from the water delivery manifold 50 to a supply port 90 associated with each shelf 70 on the rack 60. In this way, water (and nutrients) are supplied through each supply port 90 and to the water delivery manifold 50 for spraying from the spray heads 48. A shutoff valve 91 is associated with each supply port 90 which causes the supply port 90 to stop receiving water when a shelf 70 with which the tray 20 is associated is moved away from a closed position beneath an adjacent light module 72 (or for a top shelf 70, a top light module 74). This shutoff valve 91, preferably automatically reopens when the shelf 70 with a tray 20 thereon is re-closed and the tray port 51 engages with the supply port 90 adjacent to the shutoff valve 91.

Also, preferably latches 79 are either mounted on the shelves 70 or on the supply ports 90 or on the shutoff valves 91, or some combination thereof. Such latches 79 can ensure that the shelves 70 do not become unintentionally moved from their closed position toward an open position and have a shutoff valve 91 shutoff pressurized water unintentionally. While such an occurrence would not make a mess on the floor of leaking water, one of the trays 20 would not receive as much water as the others which might affect cutting C propagation. One form of latch 79 is a resilient strap with holes at ends thereof which can fit over strategically located pegs, one on the rack 60 and one on the shelf 70. When the shelf 70 is closed the strap can fit on both pegs to hold the shelf 70 closed. Other latches could alternatively be used.

The rack 60 preferably is a rectangular structure when viewed both from a front and from a side, preferably with risers 66 extending vertically at corners of the rack 60 and with horizontal elements which comprise drawer tracks for the shelves 70 therebetween. A lowermost shelf 70 preferably is a fixed planar horizontal surface which supports a reservoir 80 and pump 82, while other shelves 70 could similarly be horizontal surfaces which support trays 20. A top light module 74 is provided above a top shelf 70 which merely supports a top light above the top shelf 70. Preferably the shelves 70 are comprised of drawer arms 76 which join the risers 66 together and drawer tracks 78 which slide along the drawer arms 76 (or vice versa) to facilitate movement of the shelves 70 in and out relative to the light modules 72 and associated trays 20 to be moved from opened to closed. Such movement (along arrow D of FIG. 10) also simultaneously actuates the shutoff valve 91, either to shut off flow when the shelf 70 is moved from a closed position to an open position, or to open the shutoff valve 91 when a shelf 70 is moved from an open position to a closed position. Other forms of movable tray 20 supports could alternatively be utilized instead of the shelves 70 or basic horizontal surfaces. The drawer latch 79 is then preferably utilized (by movement along arrow F) to lock the shelf 70 in a closed position.

The rack 60 also preferably includes a single power cord 62 which feeds power to the pump 82 as well as to the various light modules 72, 74. If desired, the power cord 62 can be configured so that a light module 72 is shut off when a shelf 70 below the light module 72 is moved from a closed position to an open position. To achieve such a shutoff, a sensor would be provided adjacent each shelf 70 which would be wired into a power supply to a light above each shelf 70, to shut off an associated light module 72 when desired. Ambient light, such as from the sun or other sources off of the rack 60 could be used alternatively or in addition to the light modules 72 and top light module 74. The rack 60 also preferably includes wheels 64 beneath a lowermost portion of the rack 60 to facilitate movement of the entire system 10 easily upon an underlying hard floor or other surface.

Water supply lines 84 and water return lines 86 are associated with the risers 66 and other portions of the rack 60 which feed each of the supply ports 90 and come adjacent each of the return ports 92 adjacent each of the shelves 70. Separate shutoff valves 91 and 93 are also associated with each shelf 70. These water supply lines 84 supply pressurized water from the pump 82 and before that from the reservoir 80, and up to each of the supply ports 90 associated with each of the tray ports 51 feeding into the water delivery manifolds 50 that lead to each of the spray heads 48 within each of the hollow chambers 35 of each tray 20 (which is in a closed position). The water return lines 86 lead from each of the return ports 92 associated with each drain port 47 on each tray 20, for return of water (and any unused nutrients) back to the reservoir 80 when a tray 20 on an associated shelf 70 is in a closed position.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. An aeroponics plant propagation system, comprising in combination:
   a rack having multiple shelves spaced vertically from each other;
   at least one light located above at least one shelf on said rack;
   an aeroponics tray sized to reside carried by one of said shelves of said rack;

said aeroponics tray including a top wall with a plurality of openings therein, a plurality of said openings configured to receive a plant cutting passing therethrough;

a hollow chamber beneath said top wall of said tray;

at least one water inlet with a spray head located within said hollow chamber;

said rack including a pressurized manifold feeding water under pressure to each said water inlet within a plurality of said trays carried by said shelves of said rack, and a drain manifold receiving water draining from each of said trays;

a water reservoir receiving water from said drain manifold and a pump interposed between said reservoir and said pressurized manifold to supply pressurized water to said at least one water inlet of said plurality of said trays carried by said shelves of said rack;

wherein each of said shelves includes at least one of said aeroponics trays carried thereby, said shelves movable between a closed position and an open position and a latch holding said shelves in said closed position when said latch is closed;

wherein a plurality of collars are provided adjacent to said openings in said top wall, at least one of said collars supporting a plant cutting therein with leaves of the cutting above the collar and a stalk from which roots can extend located below said collar and within said hollow chamber beneath said top wall;

wherein said at least one spray head is fed by a water supply line which is embedded within a bottom wall of said tray between an upper surface and a lower surface of said bottom wall and defined as at least one channel between said upper surface and said lower surface of said bottom wall;

wherein said latch is located upon said shelf and upon said rack and latches said shelf to said rack in said closed position when said latch is closed;

wherein a valve is interposed between said pump and said at least one water inlet of said tray;

wherein said valve is a quick disconnect valve which shuts off water flow when said valve is opened by movement of said tray away from said closed position;

wherein said open position is horizontally spaced from said closed position;

wherein said at least one water inlet of said hollow chamber of said tray is located closer to a rear side of said tray than to a front side of said tray opposite said rear side of said tray, said open position for said tray locating said tray forward of said closed position for said tray, said open position for said tray locating said rear side of said tray closer to a position of said front of said tray when in said closed position than to a position of said rear of said tray when in said closed position;

wherein said shelves include horizontally extending drawer tracks and drawer arms, facilitating movement of said trays between said open position and said closed position;

wherein said bottom wall supports a plurality of spray heads, said spray heads pointing upwardly, each said spray head coupled to said manifold, and with said bottom wall supporting said drain of said tray;

wherein said latch for each said tray includes a resilient strap of elongate form with ends thereof connectable to said shelf and to an adjacent said tray, such that said resilient strap both holds said tray in said closed position and also applies a force on said tray keeping said at least one water inlet of said hollow chamber of said tray forced toward said manifold to maintain connection of said at least one water inlet to feeding water provided under pressure to each said water inlet from said manifold;

wherein said lowermost shelf of said rack supports said water reservoir and said pump above an underlying surface;

wherein said rack includes a plurality of wheels beneath said lowermost shelf and at a lowermost portion of said rack, to facilitate rolling of said rack upon an underlying surface;

wherein said plurality of trays each include a drain port in said bottom wall of each of said trays, said drain port and said water inlet each located on said rear side of said tray at a similar location on each of said trays, such that said plurality of trays are interchangeable;

said pressurized manifold of said rack and said drain manifold of said rack each having portions thereof located on a rear side of said rack, with said quick disconnect valves positioned with one said quick disconnect valve adjacent to each said shelf, such that said water inlet is positioned to interface with one of said valves when said tray upon which said water inlet is located is in said closed position; and wherein said pressurized manifold maintains elevated pressure water adjacent to each of said valves adjacent to each of said shelves, such that pressurized water is fed to said at least one spray head within each of said trays, regardless of which shelf of said rack said tray is located upon.

2. An aeroponics plant propagation system, comprising in combination:

a rack having multiple supports spaced vertically from each other;

at least one light located above at least one tray support on said rack;

an aeroponics tray sized to reside carried by one of said tray supports of said rack;

said aeroponics tray including a top wall with a plurality of openings therein, a plurality of said openings configured to receive a plant cutting passing therethrough;

a hollow chamber beneath said top wall of said tray;

at least one water inlet with a spray head located within said hollow chamber;

said rack including a pressurized manifold feeding water under pressure to each said water inlet within a plurality of said trays carried by said tray supports of said rack, and a drain manifold receiving water draining from each of said trays;

a water reservoir receiving water from said drain manifold and a pump interposed between said reservoir and said pressurized manifold to supply pressurized water to said at least one water inlet of said plurality of said trays carried by said tray supports of said rack;

wherein each of said tray supports includes at least one of said aeroponics trays carried thereby, said trays movable between a closed position and an open position relative to said rack;

wherein a plurality of collars are provided adjacent to said openings in said top wall, at least one of said collars supporting a plant cutting therein with leaves of the cutting above the collar and a stalk from which roots can extend located below said collar and within said hollow chamber beneath said top wall;

wherein said at least one spray head is fed by a water supply line which is embedded within a bottom wall of said tray between an upper surface and a lower surface of said bottom wall and defined as at least one channel between said upper surface and said lower surface of said bottom wall;

wherein a valve is interposed between said pump and said at least one water inlet of said tray;

wherein said valve is a quick disconnect valve which shuts off water flow when said valve is opened by movement of said tray away from said closed position;

wherein said open position is horizontally spaced from said closed position;

wherein said at least one water inlet of said hollow chamber of said tray is located closer to a rear side of said tray than to a front side of said tray opposite said rear side of said tray, said open position for said tray locating said tray forward of said closed position for said tray, said open position for said tray locating said rear side of said tray closer to a position of said front of said tray when in said closed position than to a position of said rear of said tray when in said closed position;

wherein said tray supports include horizontally extending drawer tracks and drawer arms, facilitating movement of said tray supports with trays carried thereon between said open position and said closed position;

wherein a latch is provided holding said trays in said closed position when said latch is closed;

wherein said latch for each said tray includes a resilient strap of elongate form with ends thereof connectable to said supports and to an adjacent said tray, such that said resilient strap both holds said tray in said closed position and also applies a force on said tray keeping said at least one water inlet of said hollow chamber of said tray forced toward said manifold to maintain connection of said at least one water inlet to feeding water provided under pressure to each said water inlet from said manifold;

wherein said bottom wall supports a plurality of spray heads, said spray heads pointing upwardly, each said spray head coupled to said manifold, and with said bottom wall supporting said drain of said tray;

wherein said lowermost support of said rack supports said water reservoir and said pump above an underlying surface;

wherein said rack includes a plurality of wheels beneath said lowermost support and at a lowermost portion of said rack, to facilitate rolling of said rack upon an underlying surface;

wherein said plurality of trays each include a drain port in said bottom wall of each of said trays, said drain port and said water inlet each located on said rear side of said tray at a similar location on each of said trays, such that said plurality of trays are interchangeable;

said pressurized manifold of said rack and said drain manifold of said rack each having portions thereof located on a rear side of said rack, with said quick disconnect valves positioned with one said quick disconnect valve adjacent to each said support, such that said water inlet is positioned to interface with one of said valves when said tray upon which said water inlet is located is in said closed position; and wherein said pressurized manifold maintains elevated pressure water adjacent to each of said valves adjacent to each of said support, such that pressurized water is fed to said at least one spray head within each of said trays, regardless of which support of said rack said tray is located upon.

\* \* \* \* \*